3,128,462
TEST ARRANGEMENT
Martin G. Woolfson, Baltimore, Md., assignor to Aircraft Armaments, Inc., Cockeysville, Md., a corporation of Maryland
Filed July 2, 1959, Ser. No. 824,554
11 Claims. (Cl. 343—17.7)

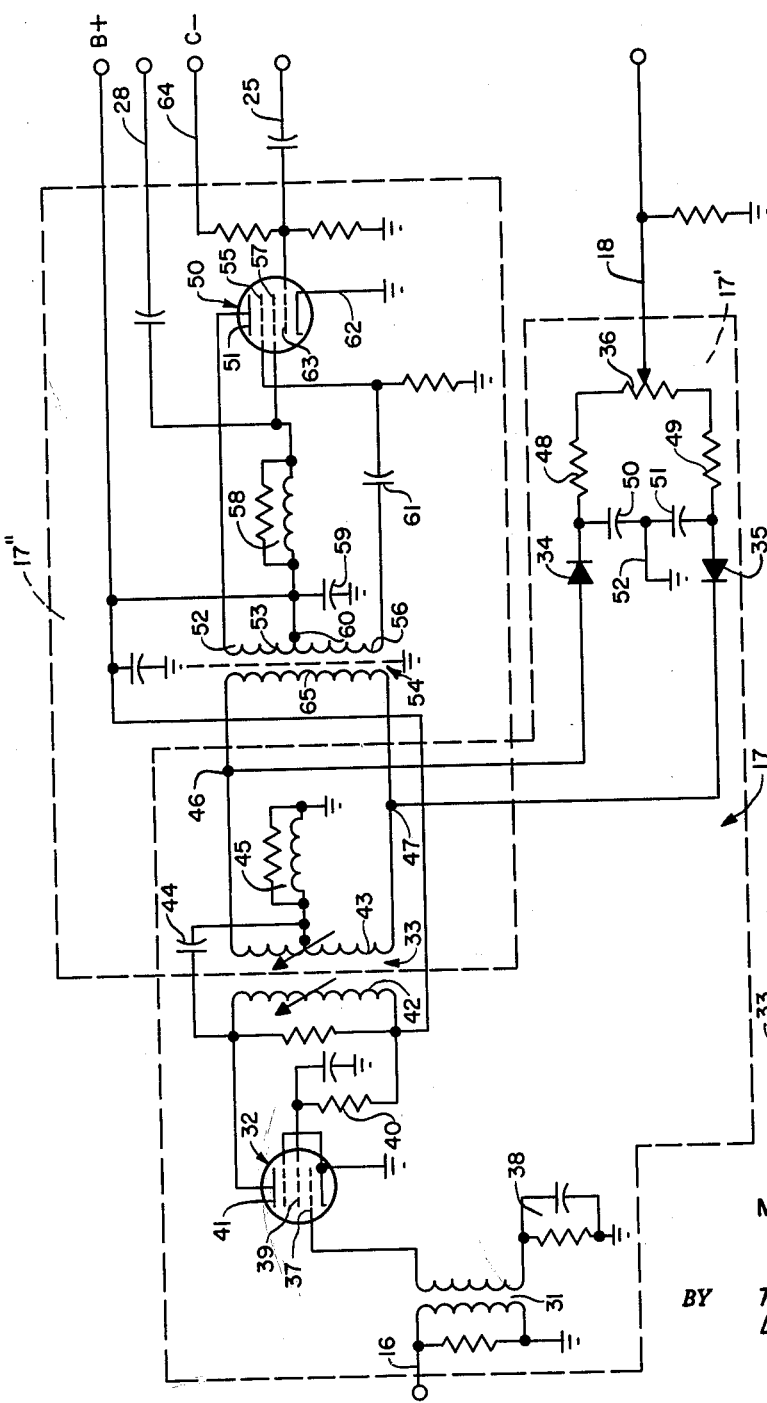

This invention relates to a test set for checking the range calibration of a radar and, more particularly, to a test set of the class which is separate from the radar and is capable of presenting thereto, an artificial target which is variable in range.

RF pulses transmitted by a radar are reflected from a target back to the radar and there received as pulses delayed in time with respect to the transmitted pulses. The delay is a measure of target range. The function of a test set of the class described is to simulate a target at a given range by transmitting pulses to the radar which are delayed in time a given amount from the pulses transmitted by the radar. A comparison of the given range fed into the test set by an operator with the range indicated by the radar enables the latter to be calibrated.

The time delay between the test set pulses and the radar pulses must be variable because the entire range of the radar must be calibrated; and the frequency of oscillation of the test set pulses must be substantially equal to the frequency of oscillation of the radar pulses so that the test set pulses will lie within the relatively narrow passband of the receiver. If the test set is to be quickly and easily used, the same frequency must be maintained without a manual tuning adjustment to the test set. The above requirements have been met in test sets by converting a radar RF pulse to an IF pulse using a local oscillator automatically tuned by means of a standard AFC circuit, delaying the IF pulse in a quartz variable delay line, and re-establishing an RF echo pulse delayed in time with respect to the RF radar pulse by remixing the delayed IF pulse with the local oscillator. The difficulty with test sets of the type described is in the variable delay line since the range of delay that may be obtained is limited. Other difficulties are presented by a quartz line such as maintaining proper bandwidth and attenuation as the delay is varied. Furthermore, quartz lines are extremely sensitive to mechanical and temperature shock preventing test sets using them from being reliable under usual conditions found in field testing radar sets.

Other test sets of the class described have been made which operate by converting a radar RF pulse to an IF pulse using a local oscillator automatically tuned by means of a standard AFC circuit, converting the IF pulse to a video pulse, delaying the video pulse by conventional circuits and using the delayed pulse to gate the output of a CW oscillator tuned to the IF frequency, and mixing the new IF pulse so created with the local oscillator to create an artificial RF echo pulse delayed in time with respect to the RF radar pulse by an amount equal to the delayed video pulse. The difficulty with test sets based on this principle is the frequency stability of the CW oscillator. Because there is no phase coherence in the pulsed signal from the radar set, it is difficult to make the CW oscillator a part of a closed loop in the test set when the pulse duration has an order of magnitude of 0.5 micro-second. When the test set must function under field conditions with widely varying ambient temperatures, resulting changes in frequency of the CW oscillator are not related to changes in the cross-over frequency of the AFC discriminator which controls the frequency of the local oscillator. A slight shift in the frequencies may mean that upon combining the local oscillator with the gated output of the CW oscillator, the delayed pulse sent back to the radar may lie outside the pass band of the radar receiver. As a result, constant manual tuning of the CW oscillator is required in order to maintain the output frequency equal to the input frequency.

It is an object of this invention to provide a test set of the class described capable of presenting artificial echo pulses to a radar whose delay with respect to radar pulses is variable and whose frequency is identical with the radar pulses, all without a manual tuning adjustment to the test set.

It is a further object of this invention to provide a test set of the class described capable of tuning a pulsed oscillator to the cross-over frequency of a discriminator used to control the frequency of a local oscillator.

It is a further object of this invention to provide a circuit capable of automatically tuning a pulsed oscillator to the frequency of a reference pulse.

As a feature of this invention whereby the objects thereof are achieved, the secondary of a discriminator which is employed in an AFC circuit, is tuned to the desired cross-over frequency, and electrically forms the tank circuit for an IF oscillator with the result that the frequency of the IF oscillator is identical with the cross-over frequency of the discriminator. A supporting circuit is employed which permits the discriminator error signal to tune the local oscillator at all times except when the IF oscillator is pulsed to produce an IF signal whose frequency is the same as that produced by mixing the local oscillator with the incoming radar pulse. The IF signal so produced, when mixed with the local oscillator, is transformed to an RF echo pulse having a frequency identical with that of the incoming radar pulse.

Still other objects, features and attendant advantages will become apparent to those skilled in the art from a reading of the following detailed description of one physical embodiment constructed in accordance with the invention, taken in conjunction with the accompanying drawings wherein:

FIGURE 2 is a schematic of the discriminator-oscillator shown in FIGURE 1.

FIGURE 3 is a schematic showing of a modification of the discriminator-oscillator.

Figure 1:
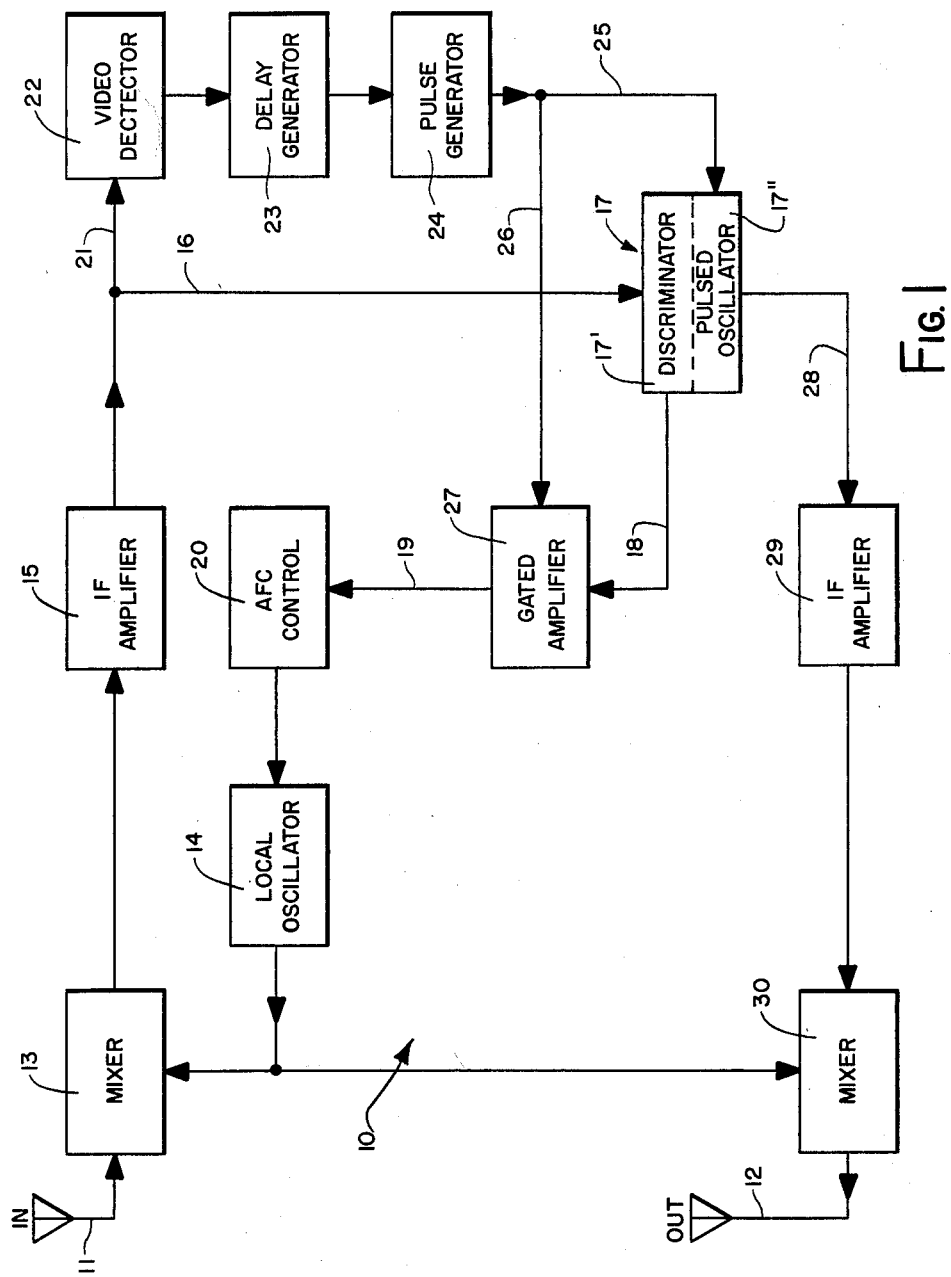
FIGURE 1 is a block diagram showing a test set having the invention embodied therein.

Referring now to the drawing, there is shown in FIGURE 1, a block diagram of a test set designated generally at 10 which an operator would place adjacent to a radar. The radar transmits short pulses of high frequency energy at a given rate of repetition. The test set antenna is illustrated schematically as a receiving antenna 11 and a transmitting antenna 12. Radar RF pulses are received from the radar at antenna 11 and, by suitable waveguide structure, are fed into mixer 13. Local oscillator 14, tuned to a frequency removed from that of the radar RF pulse frequency by an amount equal to the frequency of the IF pulse desired, is combined with the radar RF pulse in mixer 13. One of the resulting frequencies is the desired intermediate frequency, which is suitably amplified in IF amplifier 15. Timewise, the IF pulse out of the IF amplifier 15 commences at the instant the radar RF pulse is received at antenna 11.

The IF pulse out of amplifier 15 is fed via lead 16 to discriminator portion 17' of discriminator-oscillator 17, details of which are described hereinafter. Discriminator portion 17' serves to produce an error video pulse whose magnitude and polarity are proportional to the deviation of the frequency of the IF pulse from the cross-over frequency of the discriminator. Such error pulse is obtained each time an IF pulse is applied to discriminator portion 17' and is fed to AFC control circuit 20 through leads 18 and 19. Control circuit 20 tunes local oscillator 14 to a frequency such as to cause the IF pulse frequency to approach the cross-over frequency of the discriminator. In this manner, the IF pulse frequency is automatically maintained at the discriminator cross-over frequency. The stability of the IF pulse frequency and, hence, the stability of the local oscillator frequency, is dependent upon the stability of the discriminator cross-over frequency. The discriminator cross-over frequency is a function of the temperatures to which it is subjected and, hence, will vary under different ambient conditions.

The output of amplifier 15 is also fed via lead 21 to video detector 22 which detects the envelope of the IF pulse to form a video pulse which time-wise, commences with the radar pulse received at antenna 11. Variable delay generator 23 employing conventional circuits converts the video pulse out of detector 22 to trigger pulses delayed in time with respect to the RF radar pulse. The delay used may be made variable by an operator to simulate any range desired to be checked on the radar. The delayed trigger pulses are used to trigger pulse generator 24 which creates a video pulse having the same width as the radar pulse but delayed in time with respect thereto by a known amount.

Leads 25 and 26 connect the output of pulse generator 24 with pulsed oscillator 17'' and gated amplifier 27. Gate 27 connects the output of discriminator 17' via leads 18 and 19 to AFC control 20 at all times except upon receipt of the delayed video pulse via lead 26 from pulse generator 24. Thus, the delayed video pulse serves as an inhibiting gate to prevent the output of discriminator 17' from exerting any influence on the AFC control during the occurrence of the delayed video pulse. The delayed video pulse also serves as an enabling gate for oscillator 17'' causing the same to produce a pulse at the intermediate frequency.

Oscillator 17'' is electrically a part of the resonant secondary winding of the discriminator and is thus tuned to the cross-over frequency. The delayed video pulse through lead 25 operates to cause oscillator 17'' to produce a pulse at a frequency determined by the resonant frequency of the discriminator. Such pulse has the same frequency as the IF pulse but is delayed with respect thereto. The delayed IF pulse is taken via lead 28 to IF amplifier 29 and combined with the output of local oscillator 14 in mixer 30 to appear at transmitting antenna 12 as an RF echo pulse at the same frequency as the RF radar pulse appearing at receiver antenna 11 but delayed with respect thereto. As will be described hereinafter, the delay RF echo pulse is automatically kept at the same frequency as the RF radar pulse regardless of shifts in either the cross-over frequency of the discriminator or the radar frequency.

Referring now to FIGURE 2, which shows details of discriminator-oscillator 17, an IF radar pulse enters at lead 16. Discriminator 17' includes input transformer 31, limiter driver tube 32, discriminator transformer 33, diode rectifiers 34 and 35, and output potentiometer 36. The error pulses produced by discriminator 17' are taken from potentiometer 36 through lead 18. Control grid 37 of driver 32 is connected to the secondary of input transformer 31 and to ground through R-C network 38. Screen grid 39 is connected to B+ through a large screen circuit series resistor 40. Plate 41 is connected to B+ through primary 42 of transformer 33. Discriminator 17' operates at the IF pulse frequency whose order of magnitude is 40 mc. The distributed capacitances in primary winding 42 and secondary circuit of tunable transformer 33 permit the windings to form resonant circuits without the addition of lumped capacitors. The windings are loosely coupled and are constructed to be resonant at the frequency of the IF pulse to provide symmetrical spacing between the peaks on the discriminator curve. The resonant frequency of the discriminator secondary thus determines the so-called cross-over frequency. The high side of primary winding 42 is connected to the secondary at the centertap thereon through a coupling capacitor 44 which serves to block B+ from the secondary. The center tap is grounded through L-R network 45. The output of winding 43 is applied at nodes 46 and 47 to diode rectifiers 34 and 35 which are in series with resistors 48 and 49 and potentiometer 36. The cathode of diode 34 and the anode of diode 35 are connected to capacitors 50 and 51 which are in turn grounded at 52. The shunt capacitances of the diodes also form a part of the resonant secondary circuit of the transformers.

Driver tube 32 normally operates class C with self-rectification of the input IF pulse producing the required bias during the pulse to remove any amplitude modulation in the IF pulse. When the signal induced in the secondary transformer 31 swings positive, grid current flows through the resistor in R-C network 38 causing grid 37 to go negative with respect to the grounded cathode of tube 32 furnishing a negative bias to the tube. The time constant of the R-C network is such as to maintain the bias during the negative excursion of the induced signal. Screen resistor 40 provides the screen with the proper voltage. With the above described arrangement, the negative peaks of the IF pulse which exceed cut-off are clipped while the positive peaks are substantially fixed or clamped at near-zero grid volts. The output of tube 32 in response to an IF pulse at lead 16 is a constant amplitude pulse at the frequency of the IF pulse.

The voltage induced in winding 43 by the amplitude limited IF pulse applied to windings 42 is in quadrature with that of the applied pulse. The induced voltages in each half of winding 43 are 180° out of phase with respect to each other. The two resultants of the three voltages are applied to diode rectifiers 34 and 35. When the frequency of the applied IF pulse is the frequency at which secondary circuit is resonant, the resultants are equal in magnitude. When the frequency of the applied IF pulse differs from the secondary resonant frequency, the resultants are no longer equal in magnitude. With diodes 34 and 35 balanced to ground as shown in the drawing, the output through resistor 48 with respect to ground is a positive video pulse and the output through resistor 49 with respect to ground is a negative video pulse. When the frequency of the applied IF pulse is the resonant frequency of secondary 43, potentiometer 36 is adjusted so that the positive and negative pulses derived from the diodes add to zero. In such case, there is no error pulse produced since the local oscillator is already at the frequency required to produce the desired intermediate frequency when mixed with a radar pulse.

Reference is now made to FIGURE 1. If there is a deviation in the frequency of the applied IF pulse from the cross-over frequency, the amplitudes of the positive and negative pulses derived from the diodes are different, and a video pulse appears at lead 18 whose magnitude is proportional to the deviation with respect to the cross-over frequency. If there is no output from pulse generator 24 at the instant an error pulse is generated by discriminator 17', gated amplifier 27 permits the error pulse to enter lead 19 and cause AFC control 20 to correct the frequency of the local oscillator in a manner to decrease the error pulse.

Oscillator 17'' also operates at the intermediate frequency so that distributed capacitances are employed to provide resonant circuits. The oscillator circuit is essentially of the grounded cathode Hartley form. Oscillator tube 50 has plate 51 connected to one end 52 of secondary winding 53 of oscillator transformer 54. The third grid 55 of tube 50 is the oscillator grid and is connected to the other end 56 of winding 53. The plate and third grid thus operate at opposite extremes of the oscillator secondary 53. The second grid 57 of tube 50 is essentially at RF ground potential and functions as the cathode as regards the oscillator. Grid 57 is connected to ground by L-R network 58 and capacitor 59. The plate supply voltage is applied through tap 60 in winding 53 and blocked from grid 55 by capacitor 61. Cathode 62 of tube 50 is grounded, and control grid 63 is connected by lead 64 to a source of negative bias. Lead 25 is R-C coupled to lead 64 and control grid 63. The source of negative bias is sufficient to cut off tube 50, which will remain cut-off until grid 63 is driven past cut-off voltage by a positive pulse applied through lead 25 and derived from pulse generator 24.

Secondary winding 53 of transformer 54 is tightly coupled to primary winding 65 so that the coefficient of coupling is substantially unity. The opposite extremes of primary 65 are connected to nodes 46 and 47. With this arrangement, the impedances seen by tube 50 looking into ends 52 and 56 of winding 53 of transformer 54 is the impedance of the secondary of discriminator transformer 33 when the turns ratio is unity. The voltages across winding 43 and winding 53 are substantially equal in magnitude and phase. Thus, both the discriminator and oscillator effectively share the same tuned circuit and the oscillator frequency and the discriminator cross-over frequency are substantially the same. The circuit which determines the cross-over frequency actually comprises more than winding 43 of transformer 33 and its distributed capacitances, but includes the shunt capacitances of the diodes as well as secondary effects due to the loading of the winding introduced by the oscillator circuit.

Instead of providing transformer 54, winding 53 may be combined with winding 43 of transformer 33. Thus, transformer 33' may have a primary 42 and two tightly coupled center tapped secondaries 43' and 53'. The coupling between the secondaries and the primary is made substantially less than unity and may be adjusted to give the desired spacing between peaks on the discriminator curve. The coupling between the two secondaries is made as near unity as possible so that the voltage across both is the same in magnitude and phase, but the windings have very little capacitances therebetween. With complete magnetic coupling, and zero interwinding capacitance, the frequency at which the oscillator will oscillate is equal to the cross-over frequency of the discriminator.

When tube 50 conducts, the frequency of oscillation of the oscillator is thus the cross-over frequency of the discriminator. In this manner, with a given RF radar pulse frequency, any shift in the cross-over frequency of the discriminator is reflected by a shift in the local oscillator frequency. When the new oscillator frequency is combined with the new local oscillator frequency, the result is an RF echo pulse having the same frequency as the given RF radar pulse.

In operation, an initial radar RF pulse is received at antenna 11. Local oscillator 14 converts the radar RF pulse to a radar IF pulse in time coincidence therewith. Video detector 22 converts the radar IF pulse to a video pulse in time coincidence with the radar IF pulse entering discriminator 17'. The error pulse generated by the discriminator is likewise in time coincidence with the radar IF pulse and passes through gated amplifier 27. The video pulse is suitably delayed in delay generator 23 and converted to a trigger pulse which is delayed in time with respect to the radar IF pulse. The delayed trigger pulse simultaneously appears at gated amplifier 27 and oscillator 17" and serves to simultaneously cut off amplifier 27 and turn on oscillator 17" for the duration of the trigger pulse. An IF echo pulse at the discriminator cross-over frequency is generated by the oscillator. In time coincidence with this pulse, discriminator 17' produces an output at lead 18 which is gated out by amplifier 27. The IF echo pulse is then combined with the local oscillator to create an RF echo pulse at the same frequency as the original initial radar RF pulse.

It will now be appreciated by those skilled in the art that this invention provides a circuit capable of automatically tuning a pulsed oscillator to the frequency of a reference pulse when there is no phase coherence between reference pulses. Furthermore, the use of this invention enables a test set of the class described to present to a radar, artificial echo pulses whose delay is variable and whose frequency is identical with the radar pulses, all without a manual tuning adjustment to the test set.

What is claimed is:

1. A radar test set comprising means to receive an initial radar RF pulse, means including a tunable local oscillator for converting said radar RF pulse to a radar IF pulse, means to convert said radar IF pulse to a video pulse delayed in time with respect to said initial radar RF pulse, a discriminator having a tank circuit tuned to a given frequency and responsive to said radar IF pulse for producing an error signal having a polarity and magnitude proportional to the deviation of the frequency of said radar IF pulse from said given frequency, control means responsive to said error signal for tuning said local oscillator to a frequency removed from that of said radar RF pulse by an amount equal to said given frequency, and an IF oscillator including a tank circuit tuned to said given frequency and responsive to the delayed video pulse for producing an IF echo pulse delayed in time with respect to said IF radar pulse and at substantially the same frequency, means for maintaining the magnitude and phase of the voltages in the tank circuit of the discriminator equal to the magnitude and phase of the voltages in the tank circuit of the IF oscillator so that the resonant frequency of the discriminator tank circuit is the same as the resonant frequency of the oscillator tank circuit, and means including said local oscillator for converting said IF echo pulse to an RF echo pulse delayed in time with respect to said RF radar pulse and at substantially the same frequency.

2. A radar test set comprising means to receive an initial radar RF pulse, means including a tunable local oscillator for converting said radar RF pulse to a radar IF pulse, means including a circuit which is resonant at a given cross-over frequency for tuning said local oscillator to the cross-over frequency, means responsive to said radar IF pulse for producing a video pulse, means responsive to said video pulse for producing a trigger pulse delayed in time with respect to said radar RF pulse, means including said circuit responsive to the trigger pulse for producing an IF echo pulse at the cross-over frequency with a delay corresponding to the delay of the trigger pulse, and means including said tunable oscillator for converting said IF echo pulse to an RF echo pulse at the frequency of the radar RF pulse but delayed in time with respect thereto.

3. In combination, means including a local oscillator for converting high frequency input pulses to lower frequency pulses, an AFC circuit for stabilizing said local oscillator including a discriminator having a circuit which is resonant at the lower frequency, detector means for converting the lower frequency pulses to video pulses, means for delaying the video pulses with respect to the input pulses, an oscillator having a resonant circuit which includes the resonant circuit of said discriminator, said oscillator being responsive to the delayed video pulses for producing delayed pulses at the lower frequency, means responsive to the delayed video pulses for rendering the AFC circuit ineffective thereduring, and means including said local oscillator for converting the delayed lower frequency pulses to delayed output pulses at the same frequency as the input pulses.

4. A radar test set comprising means to receive an initial radar RF pulse, means including a tunable local oscillator for converting said radar RF pulse to a radar IF pulse, means to convert said radar IF pulse to a video pulse delayed in time with respect to said initial radar RF pulse, a discriminator having a tank circuit tuned to a given frequency and responsive to said radar IF pulse for producing an error signal having a polarity and magnitude proportional to the deviation of the frequency of said radar IF pulse from said given frequency, control means responsive to said error signal for tuning said local oscillator to a frequency removed from that of said radar RF pulse by an amount equal to said given frequency, and an IF oscillator including a tank circuit tuned to said given frequency, means for maintaining the frequency to which the tank circuit of the discriminator is tuned equal to the frequency to which the tank circuit of the IF oscillator is tuned, said IF oscillator being responsive to the delayed video pulse for producing an IF echo pulse delayed in time with respect to said IF radar pulse and at substantially the same frequency, and means including said local oscillator for converting said IF echo pulse to an RF echo pulse delayed in time with respect to said RF radar pulse and at substantially the same frequency.

5. A radar test set comprising means to receive an initial radar RF pulse, means including a tunable local oscillator for converting said radar RF pulse to a radar IF pulse, means to convert said radar IF pulse to a video pulse delayed in time with respect to said initial radar RF pulse, a discriminator having an element which determines the cross-over frequency of the discriminator, said discriminator being responsive to said radar IF pulse for producing an error signal with a polarity and magnitude proportional to the deviation of the frequency of said radar IF pulse from said cross-over frequency, control means responsive to said error signal for tuning said local oscillator to a frequency removed from that of said radar RF pulse by an amount equal to said cross-over frequency whereby the frequency of said radar IF pulse is maintained at said cross-over frequency, an IF oscillator having an element which determines the frequency at which said IF oscillator oscillates, means connecting the elements so that the frequency of said IF oscillator is the same as the cross-over frequency of the discriminator, said IF oscillator being responsive to the delayed video pulse for producing an echo IF pulse that is delayed in time with respect to said radar IF pulse and has a frequency equal to the cross-over frequency of said discriminator, and means including said local oscillator for converting said echo IF pulse to an echo RF pulse delayed in time with respect to and at the same frequency as said radar RF pulse.

6. A radar test set comprising means to receive an initial radar RF pulse, means including a tunable local oscillator for converting said radar RF pulse to a radar IF pulse, means to convert said radar IF pulse to a video pulse delayed in time with respect to said initial radar RF pulse, a discriminator having a rectifier circuit and a transformer with a secondary winding that determines the cross-over frequency of the discriminator, said rectifier circuit producing an error signal with a polarity and magnitude proportional to the deviation of the frequency of said radar IF pulse from said cross-over frequency when the latter pulse is applied to said discriminator, control means responsive to said error signal for tuning said local oscillator to a frequency removed from the frequency of said radar RF pulse by an amount equal to said cross-over frequency whereby the frequency of said radar IF pulse is maintained at said cross-over frequency, an IF oscillator having an inductance coil forming a part of a resonant tank circuit which determines the frequency at which said IF oscillator oscillates, means for coupling said inductance coil to said secondary winding so that the coefficient of coupling is substantially unity and the interwinding capacitance is substantially zero whereby the frequency of said IF oscillator and the cross-over frequency are substantially the same, means responsive to the delayed video pulse for causing said IF oscillator to produce an echo IF pulse with the same delay and with a frequency substantially equal to the cross-over frequency of the discriminator, and means including said local oscillator for converting said echo IF pulse to an echo RF pulse with the same delay as the delayed video pulse and with a frequency substantially equal to the frequency of the radar RF pulse.

7. A radar test set in accordance with claim 6 including means for disconnecting said rectifier circuit from said control means during occurrence of said echo IF pulse.

8. A radar test set comprising means to receive an initial radar RF pulse, means including a tunable local oscillator for converting said radar RF pulse to a radar IF pulse, means to convert said radar IF pulse to a video pulse delayed in time with respect to said initial radar RF pulse, a discriminator-oscillator device having means for maintaining the cross-over frequency of the discriminator portion at substantially the same value as the frequency of oscillation of the oscillator portion, the discriminator portion of said discriminator-oscillator being responsive to said radar IF pulse for producing an error signal having a polarity and magnitude proportional to the deviation of the frequency of said radar IF pulse from the cross-over frequency, control means responsive to said error signal for tuning said local oscillator to a frequency removed from the frequency of said radar RF pulse by an amount equal to said cross-over frequency, the oscillator portion of said discriminator-oscillator being responsive to said delayed video pulse for producing an echo IF pulse having the same delay as said delayed video pulse and the same frequency as said cross-over frequency, and a means for combining said echo IF pulse with the output of said local oscillator for producing an echo RF pulse having the same delay as said delayed video pulse and the same frequency as said radar RF pulse.

9. A radar test set in accordance with claim 8 including means responsive to said delayed video pulse for preventing said discriminator portion from exerting any influence on said control means during occurrence of said delayed video pulse.

10. In combination, means including a local oscillator for converting high frequency input pulses to lower frequency pulses, an AFC circuit for stabilizing said local oscillator including a discriminator having a circuit which is resonant at a frequency substantially the same as said lower frequency pulses, detector means for converting said lower frequency pulses to video pulses, means for delaying said video pulses with respect to said input pulses, an oscillator having a resonant circuit which includes the resonant circuit of said discriminator, said oscillator being responsive to said delayed video pulses for producing delayed pulses at substantially the same frequency as said lower frequency pulses, means responsive to the delayed video pulses for rendering the AFC circuit ineffective thereduring, and means including said local oscillator for converting the delayed lower frequency pulses to delayed output pulses at the same frequency as the input pulses.

11. In combination, means including a local oscillator for converting high frequency input pulses to lower frequency pulses, an AFC circuit for stabilizing said local oscillator including a discriminator having a circuit which is resonant at a frequency substantially the same as said lower frequency pulses, detector means for converting said lower frequency pulses to video pulses, means for delaying said video pulses with respect to said input pulses, an oscillator having a resonant circuit which includes the resonant circuit of said discriminator, said oscillator being responsive to said delayed video pulses for producing delayed pulses at substantially the same frequency as said lower frequency pulses, and means including said local oscillator for converting the delayed lower frequency pulses to delayed output pulses at the same frequency as the input pulses.

References Cited in the file of this patent

UNITED STATES PATENTS

| | | |
|---|---|---|
| 2,421,016 | Deloraine et al. | May 27, 1947 |
| 2,531,301 | Scholten | Nov. 21, 1950 |
| 2,609,510 | Wilmotte | Sept. 2, 1952 |
| 2,857,593 | Schwab | Oct. 21, 1958 |
| 2,897,352 | Smith-Vaniz | July 28, 1959 |
| 3,064,219 | Gabor | Nov. 13, 1962 |

FOREIGN PATENTS

| | | |
|---|---|---|
| 1,168,131 | France | Aug. 25, 1958 |